United States Patent
Wilkins

(10) Patent No.: US 8,523,018 B2
(45) Date of Patent: Sep. 3, 2013

(54) DIESEL EXHAUST FLUID SYSTEM HAVING A RESERVOIR SPACER

(75) Inventor: Charles O. Wilkins, Haslett, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

(21) Appl. No.: 12/785,195

(22) Filed: May 21, 2010

(65) Prior Publication Data

US 2011/0283689 A1 Nov. 24, 2011

(51) Int. Cl.
- *B67D 7/76* (2010.01)
- *B67D 7/80* (2010.01)
- *F01N 3/00* (2006.01)

(52) U.S. Cl.
USPC ......... 222/146.1; 60/286; 60/295; 222/146.2; 222/189.06

(58) Field of Classification Search
USPC .............. 60/286, 295, 324; 222/146.1, 146.2
See application file for complete search history.

(56) References Cited

U.S. PATENT DOCUMENTS

| | | | | |
|---|---|---|---|---|
| 4,861,966 | A * | 8/1989 | Matthiesen et al. | 219/205 |
| 2009/0127265 | A1* | 5/2009 | Magnusson et al. | 220/564 |
| 2010/0050606 | A1* | 3/2010 | Fulks et al. | 60/286 |
| 2010/0162690 | A1* | 7/2010 | Hosaka et al. | 60/295 |
| 2010/0294464 | A1* | 11/2010 | Graber et al. | 165/104.19 |
| 2011/0030920 | A1* | 2/2011 | Qin et al. | 165/80.3 |
| 2011/0138787 | A1* | 6/2011 | Radillo et al. | 60/295 |
| 2011/0138790 | A1* | 6/2011 | Radillo et al. | 60/303 |

* cited by examiner

*Primary Examiner* — Kenneth Bomberg
*Assistant Examiner* — Dapinder Singh
(74) *Attorney, Agent, or Firm* — Ingrassia Fisher & Lorenz, P.C.

(57) ABSTRACT

Diesel exhaust fluid systems are provided. The diesel exhaust fluid systems include a fluid reservoir having an inner surface and an opening therethrough, a fluid reservoir heating device positioned within the fluid reservoir, and a fluid reservoir spacer positioned within the fluid reservoir and between the inner surface of the fluid reservoir and the fluid reservoir heating device. The fluid reservoir spacer includes first and second portions on opposing sides of the opening through the fluid reservoir.

17 Claims, 5 Drawing Sheets

DIESEL EXHAUST FLUID SYSTEM HAVING A RESERVOIR SPACER

TECHNICAL FIELD

The present invention generally relates to automotive exhaust systems. More specifically, the present invention relates to automotive exhaust systems having diesel exhaust fluid systems.

BACKGROUND OF THE INVENTION

In recent years, advances in technology, as well as ever-evolving tastes in style, have led to substantial changes in the design of automobiles. One of the changes involves the increased use of alternative fuels (i.e., non-gasoline) in the propulsion systems of automobiles. One such alternative fuel is diesel, as it provides improved torque and fuel economy over conventional gasoline. Despite these advantages, the use of diesel in commercial vehicles has been limited in recent decades because of emission standards passed by regulatory authorities.

However, exhaust systems have now been developed that greatly reduce the amount of pollutants, such as nitrogen oxides, emitted from diesel engines. Many of these exhaust systems make use of particular fluids (i.e., diesel exhaust fluids) that are mixed with the exhaust before it is emitted. However, due to the chemical properties of the fluids, it is possible for them to become frozen within the dedicated containers in which they are stored when the automobile is subjected to extremely cold temperatures. Thus, the containers are often provided with internal heaters that are activated when the temperature within the container drops below a particular threshold. However, depending on the exact location of the container within the vehicle, thawing the fluid such that it can be properly used by the exhaust system may take an undesirably long amount of time.

Accordingly, it is desirable to provide an improved diesel exhaust fluid system that is capable of thawing frozen diesel exhaust fluid with increased efficiency. Additionally, it is desirable to provide such a system in such a way that any additional manufacturing costs are minimized. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A diesel exhaust fluid system is provided. The diesel exhaust fluid system includes a fluid reservoir having an inner surface and an opening therethrough, a fluid reservoir heating device positioned within the fluid reservoir, and a fluid reservoir spacer positioned within the fluid reservoir and between the inner surface of the fluid reservoir and the fluid reservoir heating device. The fluid reservoir spacer includes first and second portions on opposing sides of the opening through the fluid reservoir.

A diesel exhaust fluid system is provided. The diesel exhaust fluid system includes a fluid reservoir having an inner surface and an opening therethrough, a fluid pump in fluid communication with the fluid reservoir through the opening through the fluid reservoir, the fluid pump being configured to draw fluid from the fluid reservoir through the opening through the fluid reservoir, a fluid reservoir heating device positioned within the fluid reservoir, and a fluid reservoir spacer positioned within the fluid reservoir interconnecting the inner surface of the fluid reservoir and the fluid reservoir heating device. The fluid reservoir spacer includes first and second portions. The first and second portions of the fluid reservoir spacer are arranged such that the opening through the fluid reservoir is positioned between the first and second portions of the fluid reservoir spacer.

An automotive exhaust system is provided. The automotive exhaust system includes a diesel combustion engine, an exhaust manifold coupled to the diesel combustion engine, the exhaust manifold having a passageway extending therethrough, and a diesel exhaust fluid subsystem coupled to the exhaust manifold. The diesel exhaust fluid subsystem includes a fluid reservoir having an inner surface and an opening therethrough, the fluid reservoir being in fluid communication with the passageway through the exhaust manifold through the opening, a fluid reservoir heating device positioned within the fluid reservoir, and a fluid reservoir spacer positioned within the fluid reservoir and between the inner surface of the fluid reservoir and the fluid reservoir heating device. The fluid reservoir spacer includes first and second portions on opposing sides of the opening through the fluid reservoir.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the schematic diagrams shown herein depict example arrangements of elements, additional intervening elements, devices, features, or components may be present in an actual embodiment. It should also be understood that FIGS. 1-5 are merely illustrative and may not be drawn to scale.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

FIG. 1 to FIG. 5 illustrate an automotive exhaust system including a diesel exhaust fluid system (or subsystem). The diesel exhaust fluid system includes a fluid reservoir having an inner surface and an opening (e.g., an outlet) therethrough, a fluid reservoir heating device positioned within the fluid reservoir, and a fluid reservoir spacer positioned within the fluid reservoir and interconnecting the inner surface of the fluid reservoir and the fluid reservoir heating device. The fluid reservoir spacer includes first and second portions on opposing sides of the opening through the fluid reservoir, which provides improved thermal conductivity from the fluid reservoir heating device to the inner surface of the fluid reservoir. The fluid reservoir spacer may be made of an integral piece of plastic, or other material.

Figure 1:
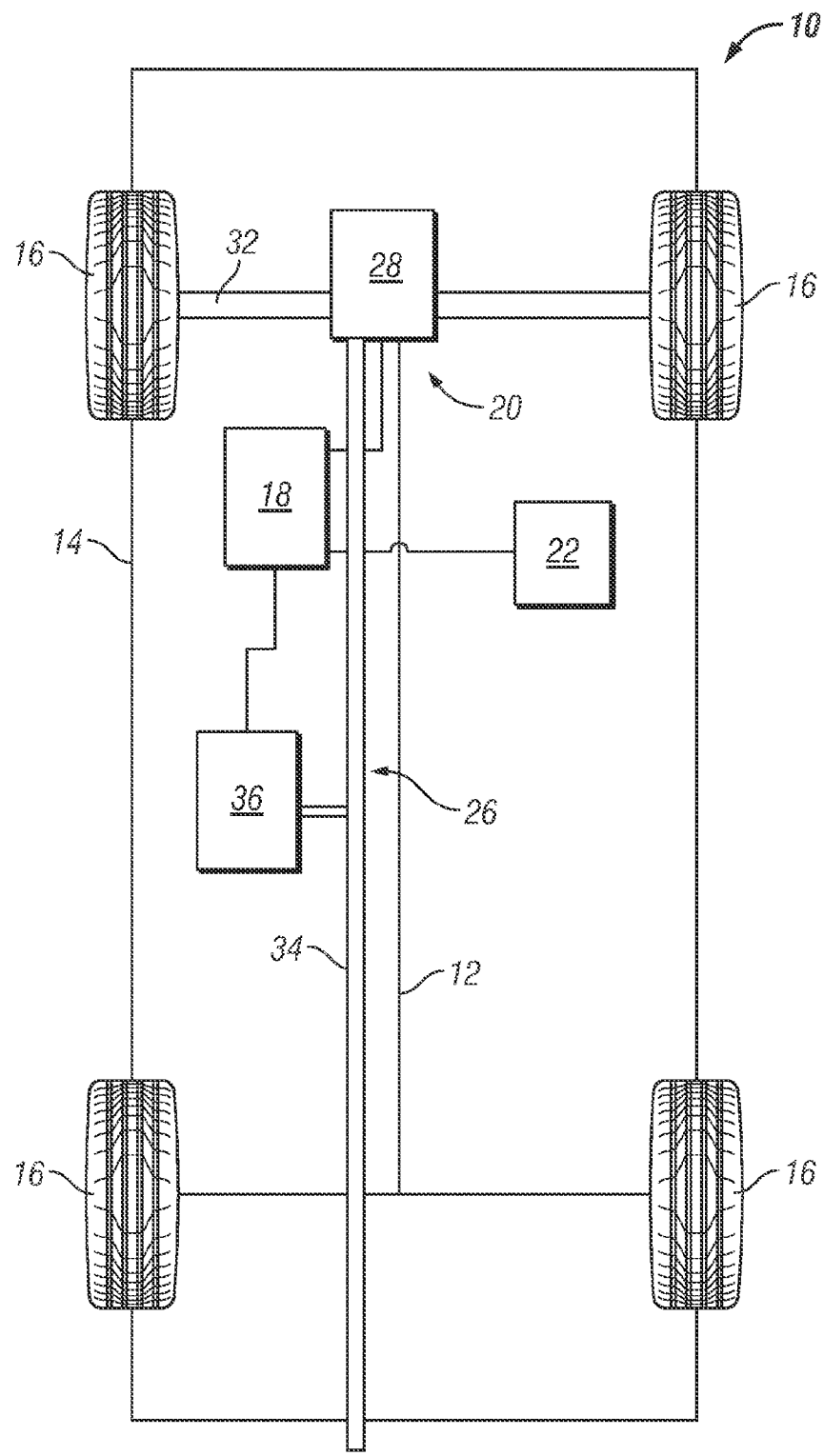
FIG. 1 is a schematic of an exemplary automobile.

FIG. 1 is a schematic view of a vehicle (or "automobile") 10, according to an embodiment. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine (i.e., such as in a hybrid electric vehicle (HEV)), and an electric motor.

The automobile 10 illustrated in FIG. 1 is a diesel-driven vehicle (e.g., a diesel truck), and further includes an actuator assembly 20, a battery (or a DC power or voltage supply) 22, and an exhaust system 26.

The actuator assembly 20 includes a diesel combustion engine 28 that is mechanically coupled to at least some of the wheels 16 through one or more drive shafts 32. The battery 22 may be a high-voltage lithium ion battery, as is commonly understood.

The electronic control system 18 is in operable communication with the actuator assembly 20, the battery 22, and the exhaust system 26. Although not shown in detail, the electronic control system 18 includes various sensors and automotive control modules, or electronic control units (ECUs), such as a vehicle controller and a diesel exhaust fluid system controller. The ECUs may include at least one processor (or processing system) and/or a memory having instructions stored thereon (or in another computer-readable medium) for carrying out the processes and methods as described below.

Figure 2:
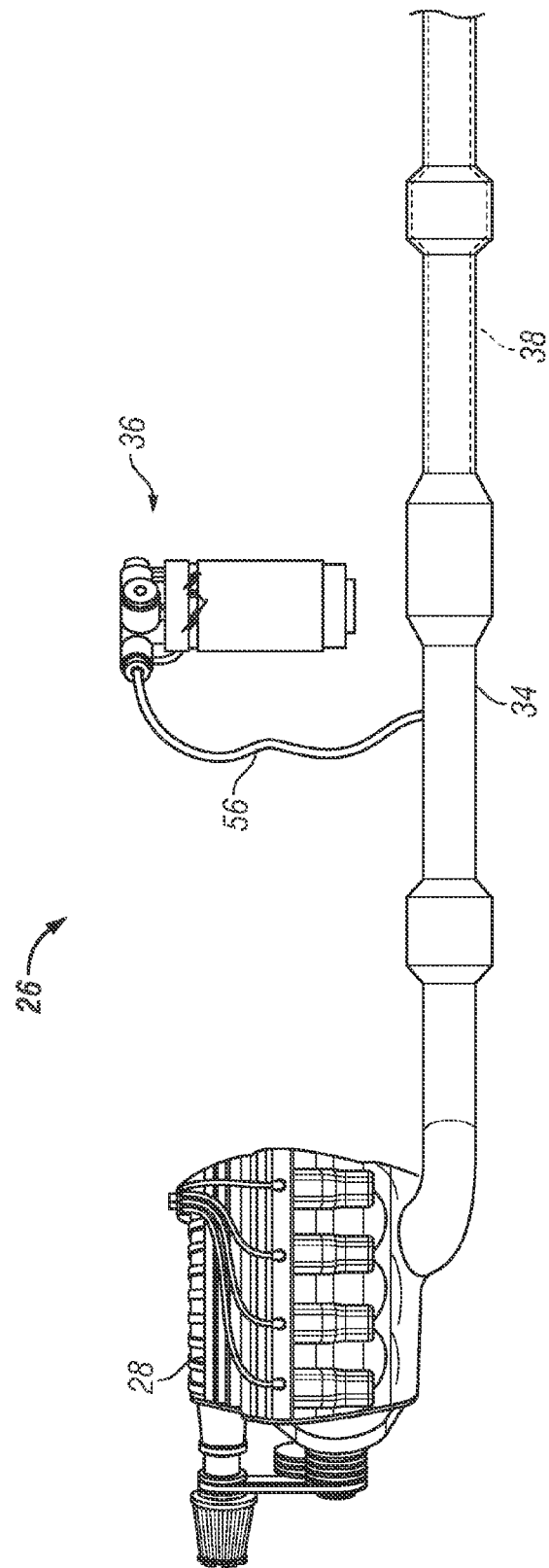
FIG. 2 is a side view of an exhaust system within the automobile of FIG. 1.

Referring to FIGS. 1 and 2, the exhaust system 26 includes an exhaust manifold 34 and a diesel exhaust fluid system (or subsystem) 36. The exhaust manifold 34 includes a passageway 38 extending therethrough, and, although not shown, a series of catalytic converters for treating exhaust from the diesel combustion engine 28. The exhaust manifold 34 is coupled to the diesel combustion engine 28 such that exhaust from the diesel combustion engine flows through the passageway 38 when the engine 28 is operated. It should be understood that the diesel combustion engine 28 may also be considered to be part of the exhaust system 26, and that the exhaust system 36 may include other components and subsystems other than those shown in FIG. 2.

Figure 3:
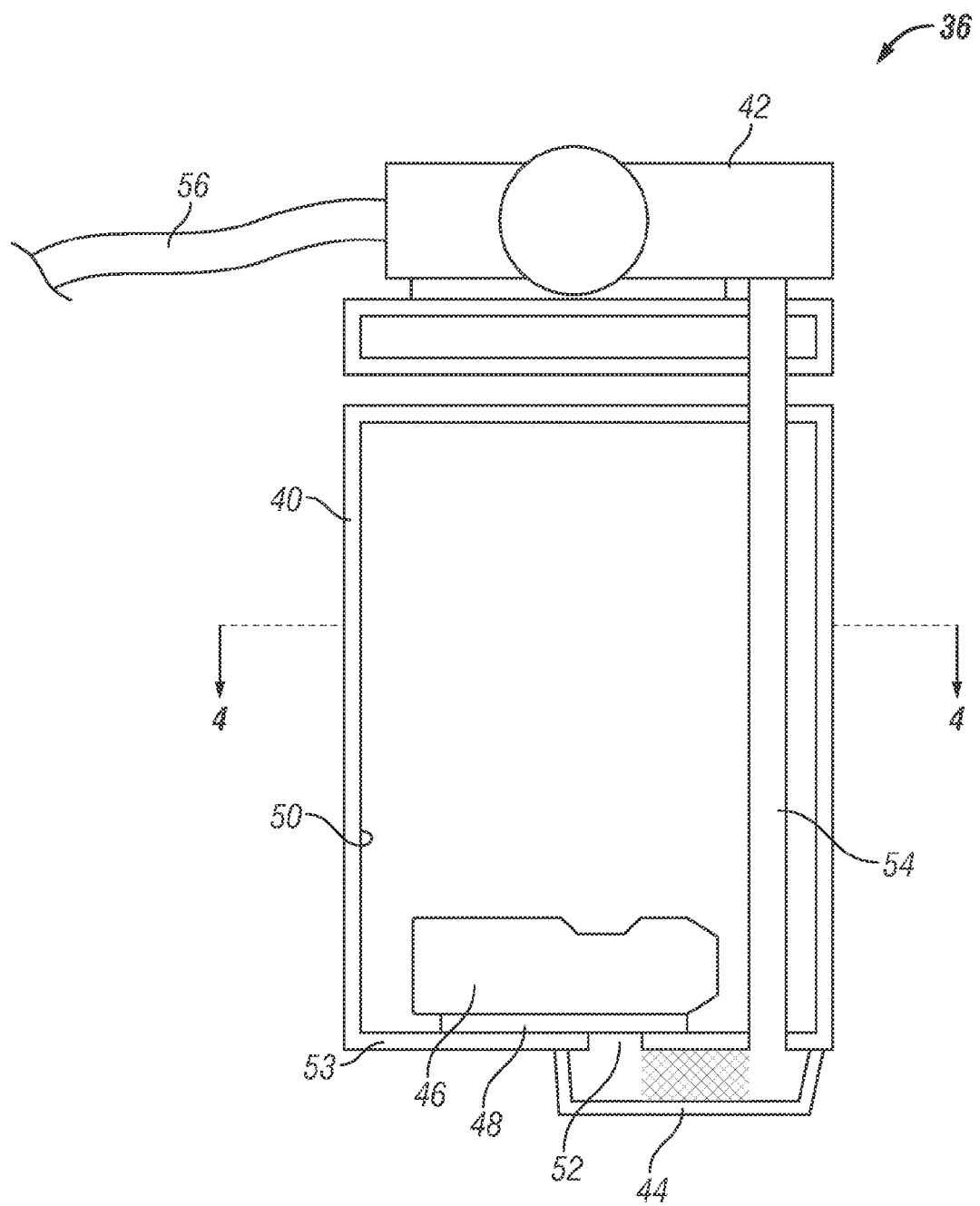
FIG. 3 is cross-sectional side view of an diesel exhaust fluid subsystem within the exhaust system of FIG. 2.

Referring now to FIGS. 2 and 3, the diesel exhaust fluid system 36 includes a diesel exhaust fluid reservoir 40, a diesel exhaust fluid pump 42, a diesel exhaust fluid filter 44, a diesel exhaust fluid heater (or heating device) 46, and a diesel exhaust fluid reservoir spacer 48. In the depicted embodiment, the diesel exhaust fluid reservoir 40 is cylindrical in shape and may be made of a plastic-like material. The fluid reservoir 40 includes and inner surface 50 and an outlet 52. As shown, the outlet 52 is an opening extending through a bottom portion (or wall) 53 of the fluid reservoir 40. Although not specifically shown, in one embodiment, the fluid reservoir 40 may be arranged in the automobile 10 (FIG. 1) such that the bottom portion 53 of the fluid reservoir 40 is the portion of the fluid reservoir 40 that is closest to an exterior of the automobile 10. Prior to use, the fluid reservoir 40 may be filled with a suitable diesel exhaust fluid, as is commonly understood, such as a mixture of chemically pure urea and deionized water.

The diesel exhaust fluid pump 42 is mounted on top of the fluid reservoir 40 and, although not specifically shown, is in operable communication with the electronic control system 18.

The diesel exhaust fluid filter 44 is connected to the bottom portion of the fluid reservoir 40 adjacent to the outlet 52. The fluid filter 44 is configured to remove debris and/or contaminants from diesel exhaust fluid as it passes therethrough. As such, the fluid filter 44 may include, for example, a series of membranes and/or meshes through which the diesel exhaust fluid passes. The fluid filter 44 is in fluid communication with the fluid pump 42 (i.e., an inlet of the fluid pump 42) through a reservoir tube 54 that extends from the filter to the fluid pump 42 up through the fluid reservoir 40. An outlet of the fluid pump 42 is in fluid communication with the exhaust manifold 34 through a manifold tube 56.

Figure 4:
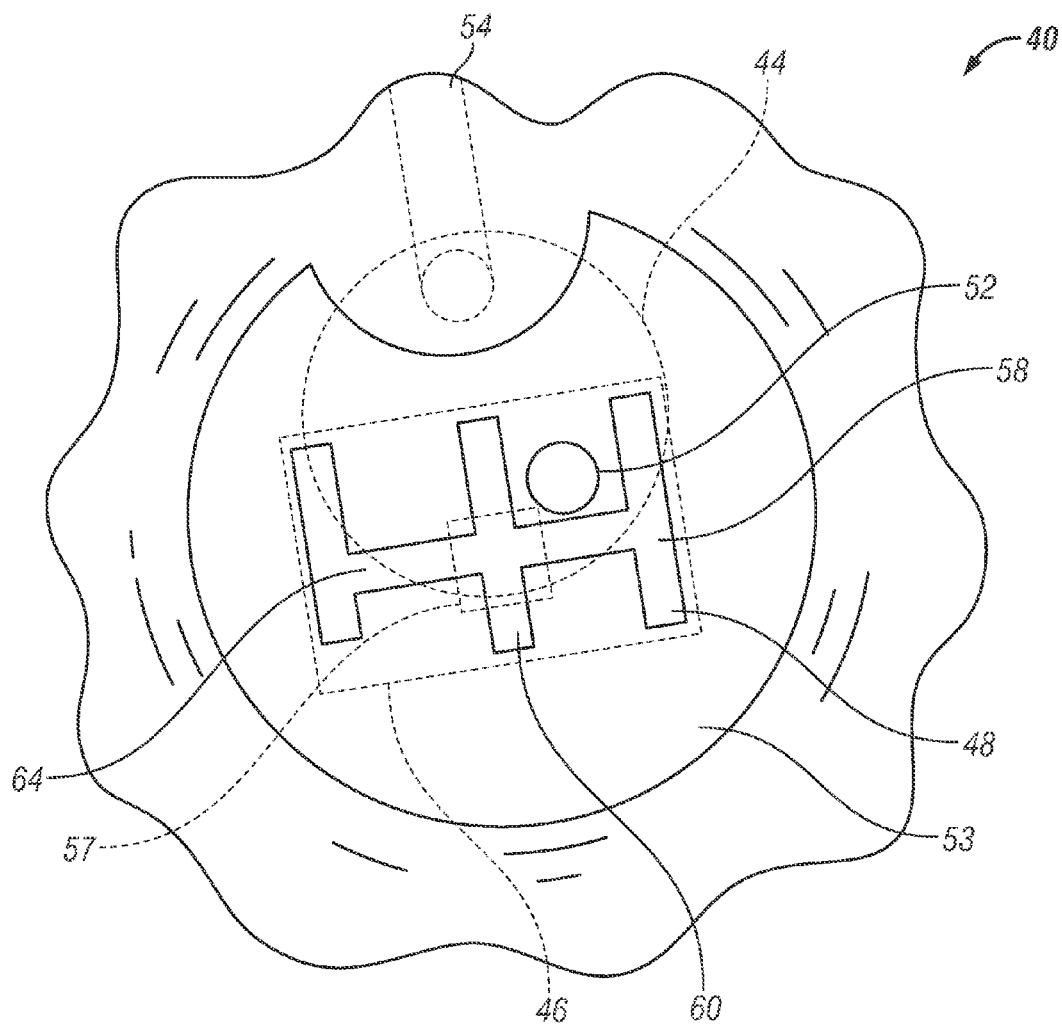
FIG. 4 is a cross-sectional view of a diesel exhaust fluid reservoir in FIG. 3 taken along line 4-4.

Referring now to FIGS. 3 and 4, the diesel exhaust fluid heater 46 (shown with a dashed line in FIG. 4) is positioned near the bottom portion of the fluid reservoir 40 and lying on top of the diesel exhaust fluid reservoir spacer 48. In one embodiment, the fluid heater 46 is a 750 watt, 12.0 volt electric heater, and although not specifically shown, is in operable communication with the electronic control system 18. Although not shown, the diesel exhaust fluid system 36 may also include a temperature sensor, such as within the fluid heater 46, for measuring the temperature of diesel exhaust fluid within the fluid reservoir 40.

The reservoir spacer 48 lies against the inner surface 50 of the fluid reservoir 40 on the bottom portion thereof. The reservoir spacer 48 interconnects, or is positioned between, the fluid heater 46 and the bottom portion 53 of the fluid reservoir 40 and is positioned (at least partially) between the fluid heater 46 and the fluid filter 44. In particular, the reservoir spacer 48 interconnects a central portion 57 of the fluid heater 46 and the bottom portion 53 of the fluid reservoir 40. It should be understood that although the fluid heater 46 is positioned directly over the outlet 52 because the fluid heater 46 is suspended above the bottom portion 53 of the fluid reservoir 40 by the reservoir spacer 48, diesel exhaust fluid within the fluid reservoir 40 is able to freely flow through the outlet 52. That is, the fluid heater 46 does not block the diesel exhaust fluid from flowing through the outlet 52, as might be the case if the fluid heater 46 were to be placed directly on the inner surface 50 of the bottom portion 53 of the fluid reservoir.

Figure 5:
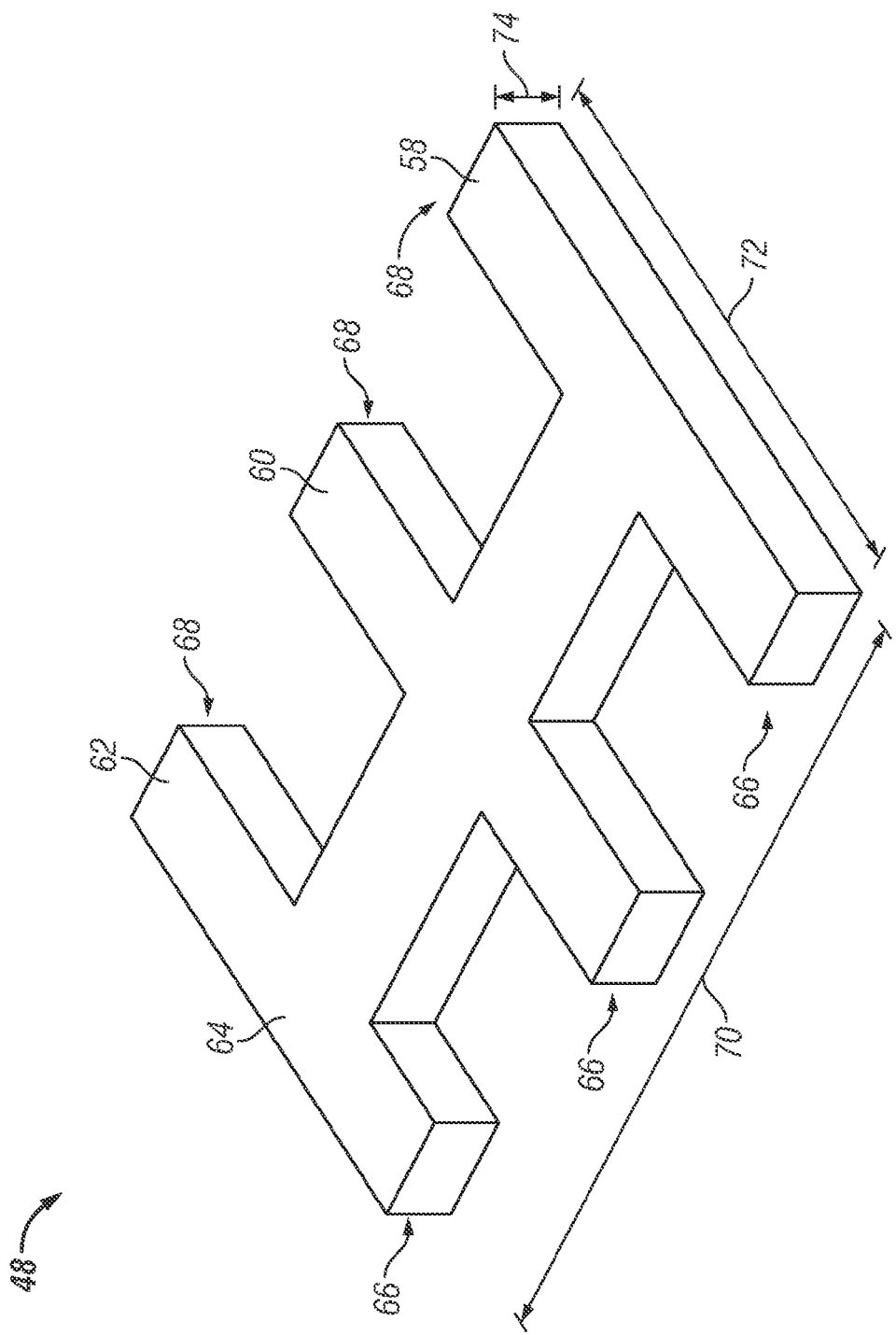
FIG. 5 is an isometric view of a diesel exhaust fluid reservoir spacer within the diesel exhaust fluid reservoir of FIG. 4.

Referring to FIGS. 4 and 5, the reservoir spacer 48 is, in one embodiment, an integral piece (i.e., one piece) of a plastic material, such as a polyoxymethylene plastic. In the depicted embodiment, the reservoir spacer 48 may be described as including three cross pieces (or portions) 58, 60, and 62 and one interconnecting piece 64. As such, the reservoir spacer 48 may be described as including first, second, third, and fourth portions. These numeric labels (i.e., first, second, third, and fourth) may be used interchangeably among cross pieces 58, 60, and 62 and the interconnecting piece 64. The cross pieces 58, 60, and 62 each have opposing ends 66 and 68. The interconnecting piece 64 is connected to each of the cross pieces 58, 60, and 62 between the opposing ends 66 and 68 thereof.

In one embodiment, the reservoir spacer 48 has, for example, an overall length 70 of approximately 10 centimeters (cm), an overall width 72 of approximately 5 cm, and a thickness 74 of approximately 4 millimeters (mm). As is evident in FIG. 4, the length 70 and width 72 of the reservoir spacer 48 (shown in FIG. 5) may also correspond to the length and width of the fluid heater 46 (i.e., the length and width of the fluid heater 46 may be approximately the same as the length 70 and the width 72 of the reservoir spacer 48). Although the reservoir spacer 48 is shown as being a separate piece, in other embodiments, the reservoir spacer 48 may be integrated into the bottom portion 53 of the fluid reservoir 40. The reservoir spacer 48 may also be made of other materials, such as metals (e.g., steel, copper, aluminum, etc.) in other embodiments.

Referring specifically to FIG. 4, in the depicted embodiment, the reservoir spacer 48 is installed in the fluid reservoir 40 such that the outlet 52 is positioned between cross piece 58 (a first portion of the reservoir spacer 48) and cross piece 60 (a second portion of the spacer reservoir 48). In other words, cross piece 58 and cross piece 60 lie on opposing sides of the outlet 52 (or the outlet 52 lies between cross piece 58 and cross piece 60).

Referring to FIG. 1, during normal operation (i.e., driving), the automobile 10 is operated by providing power to the wheels 16 with the diesel combustion engine 28.

When the diesel combustion engine 28 is in use, the electronic control system 18 activates the diesel exhaust fluid system 36, in particular, the fluid pump 42. The fluid pump 42 draws diesel exhaust fluid from the fluid reservoir 40 into the fluid filter 44 through the outlet 52. As the diesel exhaust fluid passes through the fluid filter 44, any debris and/or contaminants are removed. The diesel exhaust fluid then flows through the reservoir tube 54, the fluid pump 42, the manifold tube 56, and into the passageway 38 through the exhaust manifold 34. Within the passageway 38, the diesel exhaust fluid is used to reduce nitrogen oxide emissions from the automobile 10.

If the temperature within the fluid reservoir 40 is detected as being less than a predetermined threshold (e.g., about 41° F.), the fluid heater 46 is activated to ensure that sufficient diesel exhaust fluid in the fluid reservoir 40 is thawed out such that it can be drawn through the filter 44 by the fluid pump 42. Due to the arrangement of the fluid reservoir 40 (i.e., with the bottom portion 53 near the exterior of the automobile 10), the diesel exhaust fluid in and/or near the filter 44 may experience the coldest temperatures and may be the most likely to be frozen.

Because of the relatively large interconnection between the fluid heater 46 and the bottom portion 53 of the fluid reservoir 40 provided by the reservoir spacer 48, an improved thermal path between the fluid heater 46 and the inner surface 50 of the bottom portion 53 of the fluid reservoir 40, and thus the fluid filter 44, is provided. Therefore, the thaw efficiency for any diesel exhaust fluid that has become frozen within the fluid filter 44 is increased. As a result, the likelihood that any exhaust from the diesel combustion engine 28 will be emitted from the automobile 10 without being treated by the diesel exhaust fluid is reduced. In one experiment, the use of the reservoir spacer 48 was shown to increase the temperature of the diesel exhaust fluid within the filter 44 by approximately 2° F., when compared to not using the spacer 48, after the fluid heater 46 had been operated for 90 minutes.

The system described above may be implemented in systems other than automobiles, such as watercraft and aircraft. It should be noted that the numerical ranges provided above are intended to serve only as examples and not intended to limit the use of the system described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A diesel exhaust fluid system comprising:
  a fluid reservoir having an inner surface and an opening defined through a wall of the fluid reservoir;
  a fluid reservoir heating device positioned within the fluid reservoir;
  a fluid reservoir spacer positioned wholly within the fluid reservoir adjacent to the wall and between the inner surface of the fluid reservoir and the fluid reservoir heating device, the fluid reservoir spacer comprising first and second portions on opposing sides of the opening through the fluid reservoir;
  a fluid filter disposed in a housing separate from the fluid reservoir, the housing coupled to the fluid reservoir adjacent to the opening; and
  a fluid pump including a reservoir tube in fluid communication with the opening through the fluid reservoir such that activation of the fluid pump causes diesel exhaust fluid in the fluid reservoir to be drawn through the opening, through the fluid filter, through the reservoir tube and into the fluid pump.

2. The diesel exhaust fluid system of claim 1, wherein the fluid reservoir spacer further comprises a third portion interconnecting the first and second portions thereof.

3. The diesel exhaust fluid system of claim 2, wherein the first and second portions of the fluid reservoir spacer each have first and second opposing ends, and wherein the third portion of the fluid reservoir spacer is connected to each of the first and second portions of the fluid reservoir spacers between the respective first and second ends thereof.

4. The diesel exhaust fluid system of claim 3, wherein the fluid reservoir spacer further comprises a fourth portion connected to the third portion of the fluid reservoir spacer, and wherein the first and fourth portions of the reservoir spacer are connected to the third portion of the reservoir spacer on opposing sides of the second portion of the reservoir spacer.

5. The diesel exhaust fluid system of claim 1, wherein the fluid reservoir spacer is positioned between the fluid reservoir heating device and the fluid filter.

6. The diesel exhaust fluid system of claim 5, wherein the fluid reservoir spacer is made of an integral piece of plastic.

7. The diesel exhaust fluid system of claim 6, wherein the fluid reservoir spacer is made of polyoxymethylene plastic.

8. The diesel exhaust fluid system of claim 7, wherein the fluid reservoir spacer has a thickness of approximately 4 mm.

9. A diesel exhaust fluid system comprising:
- a fluid reservoir having an inner surface, a wall and an opening defined through the wall;
- a fluid pump in fluid communication with the fluid reservoir through a reservoir tube in fluid communication with the opening through the fluid reservoir, the fluid pump draws fluid from the fluid reservoir through the opening through the fluid reservoir with the reservoir tube;
- a fluid reservoir heating device positioned wholly within the fluid reservoir;
- a fluid reservoir spacer positioned within the fluid reservoir interconnecting the inner surface of the fluid reservoir and the fluid reservoir heating device, the fluid reservoir spacer positioned adjacent to the wall and comprising first and second portions, the first and second portions of the fluid reservoir spacer being arranged such that the opening through the fluid reservoir is positioned between the first and second portions of the fluid reservoir spacer; and
- a fluid filter positioned between the opening of the fluid reservoir and the reservoir tube such that the fluid pump draws fluid from the opening of the fluid reservoir through the fluid filter via the reservoir tube.

10. The diesel exhaust fluid system of claim 9, wherein the fluid reservoir spacer comprises a third portion interconnecting the first and second portions thereof.

11. The diesel exhaust fluid system of claim 10, wherein the fluid reservoir spacer is made of an integral piece of plastic.

12. The diesel exhaust fluid system of claim 11, wherein the fluid reservoir spacer is positioned between the fluid reservoir heating device and the fluid filter, and the fluid reservoir spacer is contained wholly within the fluid reservoir.

13. The diesel exhaust fluid system of claim 12, wherein the fluid reservoir spacer has a thickness of approximately 4 mm.

14. The diesel exhaust fluid system of claim 9, wherein the reservoir tube extends from the fluid filter to the fluid pump up through the fluid reservoir.

15. An automotive exhaust system comprising:
- a diesel combustion engine;
- an exhaust manifold coupled to the diesel combustion engine, the exhaust manifold having a passageway extending therethrough; and
- a diesel exhaust fluid subsystem coupled to the exhaust manifold, the diesel exhaust fluid subsystem comprising:
  - a fluid reservoir having an inner surface and an opening defined through a bottom portion of the fluid reservoir, the fluid reservoir being in fluid communication with the passageway through the exhaust manifold through the opening;
  - a fluid reservoir heating device positioned within the fluid reservoir;
  - a fluid reservoir spacer positioned wholly within the fluid reservoir adjacent to the bottom portion and between the inner surface of the fluid reservoir and the fluid reservoir heating device, the fluid reservoir spacer comprising first and second portions on opposing sides of the opening through the fluid reservoir;
  - a fluid filter disposed in a housing separate from the fluid reservoir, the housing coupled to the bottom portion of the fluid reservoir adjacent to the opening; and
  - a fluid pump including a reservoir tube in fluid communication with the opening through the fluid reservoir such that activation of the fluid pump causes diesel exhaust fluid in the fluid reservoir to be drawn through the opening, through the fluid filter, through the reservoir tube and into the passageway through the exhaust manifold.

16. The automotive exhaust system of claim 15, wherein the fluid reservoir spacer further comprises a third portion interconnecting the first and second portions thereof, and wherein the fluid reservoir spacer is positioned between the fluid reservoir heating device and the fluid filter.

17. The automotive exhaust system of claim 16, wherein the fluid reservoir spacer is made of an integral piece of polyoxymethylene plastic.

* * * * *